United States Patent Office 3,355,460
Patented Nov. 28, 1967

3,355,460
HIGH-ENERGY ORGANIC COMPOUNDS
OZONIZED
Perry A. Argabright and Ralph J. Leary, Cranford, N.J., assignors to Esso Research and Engineering Company, a corporation of Delaware
No Drawing. Filed May 1, 1961, Ser. No. 107,282
3 Claims. (Cl. 260—339)

This invention relates to ozonides of $NF_2$-containing cyclic unsaturated ethers as new and useful compositions and to their preparation.

$NF_2$-containing cyclic unsaturated ethers are heterocyclic 5- to 6-membered ring compounds containing 4 carbon atoms, 1 to 2 oxygen atoms as the hetero atoms and containing a double bond in the ring, e.g. mono $N_2F_4$ adducts of furans and dioxadiene. They have been formed by making the cyclic unsaturated ethers having in their ring 2 double bonds react with the $N_2F_4$ under conditions that make difluoramino ($NF_2$) groups attach to 2 carbon atoms in the ring so as to saturate one of of the double bonds and leave the other double bond, thus forming the bis ($NF_2$) adduct.

The bis ($NF_2$) adduct of furan is formed by reacting one mol of furan with one mol proportion of $N_2F_4$ at a temperature in the range of 90° to 160° C., as in the following sequence:

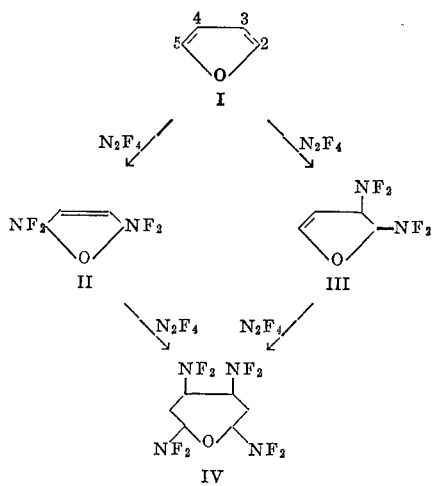

Compound I, which is furan, $C_4H_4O$, is indicated to form the mono-$N_2F_4$ adduct II by 2-5 addition and the isomeric mono-$N_2F_4$ adduct III by 2-3 addition.

Compounds II and III and bis ($NF_2$) adducts of furan and these in turn form the tetrakis ($NF_2$) adduct IV by addition of more $N_2F_4$.

In accordance with the present invention, ozone is reacted with the bis ($NF_2$) cyclic unsaturated ethers to yield ozonides which are useful oxidizers in rocket propellants or other gas-generating compositions, e.g. in explosives. The ozonides may be used also as intermediates in the synthesis of other types of compounds containing $NF_2$ and in the synthesis of mono-and bi-functional compounds, e.g. carboxylic acids, aldehydes, alcohols, and glycols.

The ozonides of the $NF_2$-containing cyclic unsaturated ethers are of interest because they can be formed and reacted safely under ordinary conditions, considering the fact that these compounds contain high-energy $NF_2$ groups.

The method of ozonization consists in passing ozonized oxygen (1–6% ozone, 99–94% oxygen) into a solution of the $NF_2$-containing cyclic unsaturated ether dissolved in a suitable solvent, e.g. $CCl_4$. Other inert solvents may be used, e.g. $CHCl_3$, hexane, ethyl acetate and ethyl chloride. The ozone is passed into the solution until ozonization of the double bond in the cyclic ether is complete. The solvent is removed under reduced pressure to leave high boiling ozonide product.

In the following examples are illustrative methods of synthesizing the $NF_2$-containing cyclic unsaturated ethers, their ozonolysis and reactions of their ozonides.

EXAMPLE I

In a typical experiment, 7.5 millimoles of freshly distilled furan were allowed to react with 7.5 millimoles of $N_2F_4$ at 155° C. for 2 hours in a glass bulb reactor using a temperature controlled oil heating bath. The initial pressure at reaction temperature was 703 mm. Hg abs. The colorless liquid adduct weighing 950 mg. was collected as a distillate product. The total crude product yield was 83.5%. The furan-$N_2F_4$ monoadduct mixture, 496 mg., dissolved in one-half ml. $CCl_4$ was ozonized at $-15°$ to $-20°$ C. for 15 hours. The final reaction mixture was subjected to high vacuum at room temperature (about 23° C.) to remove $CCl_4$ and any unreacted starting material. The resulting non-volatile viscous oil (colorless) was analyzed without further purification.

TABLE 1.—ANALYSIS OF OZONIDE OF BIS ($NF_2$) FURAN ADDUCT

| | Found | Theory for $C_4H_4O$ $(NF_2)_2O_3$ |
|---|---|---|
| Percent N | 12.54 | 12.73 |
| Percenr F | 34.0 | 34.5 |
| F/N | 1.99 | 2.00 |

The ozonide product reacts rapidly with KI in $H_2O$ to liberate free iodine which is typical of the ozonides. The starting material reacts with KI at a much slower rate. Infrared spectral analysis also supported the presence of the ozonide group as well as the ether and $NF_2$ group. Infrared spectrum of the product showed the characteristic ozonide peak.

EXAMPLE II

A sample of the ozonide of the bis ($NF_2$) furan adduct was reacted with $H_2O$ at room temperature. The aqueous reaction mixture was one phase. After removing $H_2O$ under high vacuum at room temperature, a white semisolid remained. This semi-solid material was separated into two fractions, an ethyl ether-insoluble solid and an ethyl ether-soluble oil. Said solid and said oil were analyzed as follows:

TABLE 2.—ANALYSIS OF HYDROLYZED OZONIDES

| | Found | |
|---|---|---|
| | Solid | Oil |
| Percent N | 17.46 | 18.20 |
| Percent F | 46.0±0.5 | 24.4 |
| $NaCHO_3$ Test | + | + |

A value of 46.5% F. for the solid was obtained by titrating the sample in $H_2O$ at 0° C. with NaOH and back-titrating with $Th(NO_3)_4$ after acidification to a pH of 3. A similar value, 45.2% F. was obtained by conventional wet fluorine analysis. The solid is a mixture of compounds and it has been difficult to assign an exact structure.

EXAMPLE III

The bis ($NF_2$) adduct of dioxadiene was prepared by reacting $N_2F_4$ with dioxadiene in a glass bulb reactor at 80° to 100° C. for 1 to 2 hours. The colorless liquid product was isolated in 90% yield and was found to contain $NF_2$ in amount required for the composition $C_4H_4O_2(NF_2)_2$. Infrared spectrum showed that the product had the structure of bis (di-fluoramino) dioxene.

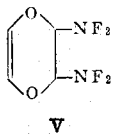

V

A solution of 647 mg. of the bis (difluoramino) dioxene (V) in 3 ml. of $CCl_4$ was ozonized at 0° C. for 40 minutes and then for an additional 40 minutes at room temperature. The $O_3$ content of the ozonizing gas stream was 6% and the gas was free of nitrogen oxides. A colorless oil separated throughout the course of the reaction. The $CCl_4$ solvent was removed under high vacuum at room temperature to yield a colorless, immobile liquid which was only slightly miscible with $CCl_4$ but was completely miscible with ethyl ether. The product was analyzed without further purification.

TABLE 3.—ELEMENTAL ANALYSIS OF OZONIDE OF BIS $(NF_2)$ DIOXENE

| | Found | Theory for $C_4H_4O_2$ $(NF_2)_2O_3$ |
|---|---|---|
| Percent N | 12.16 | 11.87 |
| Percent F | 32.3 | 32.2 |
| F/N | 1.95 | 2.00 |

Infrared spectrum confirmed that the compound contained the ozonide structure and the cyclic ether structure with the attached $NF_2$ groups as represented in the following structural formula:

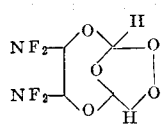

VI

The presence of the ozonide group in the cyclic ethers lends itself to a number of cleavage reactions, such as by oxidation, hydrolysis, epoxidation, halogenation and hydrolysis.

The ozonides of the cyclic ether ($NF_2$) adducts have very low volatilities, less than 0.05 mm. Hg at 24° C. Their sensitivity to impact, e.g., 2 kg. inches, makes them easily detonated. Their chemical composition is such as to make them capable of releasing a high volume of gas when used as an explosive, as a propellant ingredient, or gas generating material. This gas generating ability is attributable to the close balancing of the constituents; e.g., in the furan adduct there are 4 O atoms that can combine with the 4 C atoms and 4 F atoms that can combine with the 4 H atoms.

Various modifications will be apparent to those skilled in the art from the disclosure of the invention set forth.

The furan difluoramino ozonide adduct has an excellent specific impulse value of 261, compared to the specific impulse values of other monopropellants that have been used.

What is claimed is:
1. Ozonide of $NF_2$-containing cyclic unsaturated ether from the group consisting of ozonide of bis ($NF_2$) adduct of furan and ozonide of bis ($NF_2$) dioxene.
2. Ozonide of bis ($NF_2$) adduct of furan.
3. Ozonide of bis ($NF_2$) dioxene.

References Cited
UNITED STATES PATENTS 3,083,209   3/1963   Habib et al. _____ 260—339
3,145,217   8/1964   Horeczy et al. _____ 260—339

OTHER REFERENCES

Hoffman et al., Chemical Reviews, vol. 62, pp. 1–18 (1962).

Banks, Fluorocarbons and Their Derivatives, Oldbourne Press (London), 1964, pp. 82–95.

NORMAN S. MILESTONE, *Primary Examiner.*

LEON D. ROSDOL, *Examiner.*

J. W. WHISLER, *Assistant Examiner.*